United States Patent [19]
Arai et al.

[11] 3,964,017
[45] June 15, 1976

[54] TEST SYSTEM FOR SKID CONTROL APPARATUS

[75] Inventors: Hiroshi Arai; Juichi Shibatani, both of Toyota, Japan

[73] Assignee: Toyota Jidosha Kogyo Kabushiki Kaisha, Japan

[22] Filed: July 24, 1974

[21] Appl. No.: 491,322

[30] Foreign Application Priority Data
Mar. 20, 1974 Japan.................................. 49-30912

[52] U.S. Cl. ............................ 340/52 C; 188/181 R; 303/21 BE
[51] Int. Cl.² ............................................ B60T 8/02
[58] Field of Search .............. 340/52 R, 52 B, 52 C, 340/53, 69; 188/181 R; 303/20, 21 B, 21 BE

[56] References Cited
UNITED STATES PATENTS

| | | | |
|---|---|---|---|
| 3,796,469 | 3/1974 | Birge | 340/52 B |
| 3,848,933 | 11/1974 | Ochiai | 188/181 C X |
| 3,852,613 | 12/1974 | Wienecke | 340/52 B |

*Primary Examiner*—Alvin H. Waring
*Attorney, Agent, or Firm*—Toren, McGeady and Stanger

[57] ABSTRACT

In the system disclosed a detector detects whether a vehicle's engine is started or not. In response to starting of the engine, the detector causes an actuating circuit to actuate an automatically regulated skid-control modulator that controls the hydraulic pressure between a master cylinder and a wheel cylinder. A second detector senses whether the modulator is operating. A detecting circuit determines whether the operation of the skid control system is normal or abnormal in response to the output signal from the second detector and the actuating circuit. A memory circuit stores the output signal from the detecting circuit to generate a warning signal. An alarm device responds to the warning signal to produce an audible or visible alarm.

36 Claims, 5 Drawing Figures

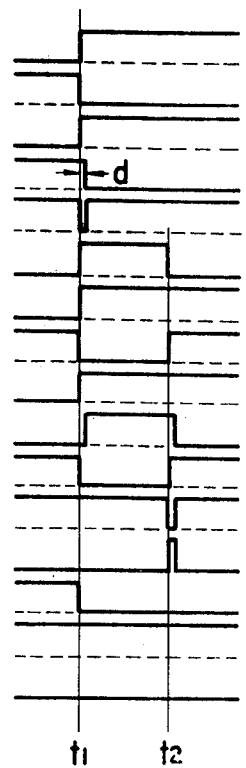
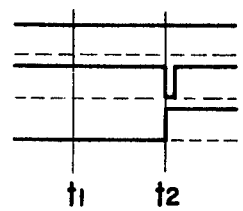
FIG. 3a
FIG. 3b
FIG. 3c
FIG. 3d
FIG. 3e
FIG. 3f
FIG. 3g
FIG. 3h
FIG. 3i
FIG. 3j
FIG. 3k
FIG. 3l
FIG. 3m
FIG. 3n
FIG. 3o
FIG. 3p
FIG. 3n'
FIG. 3o'
FIG. 3p'
FIG. 4
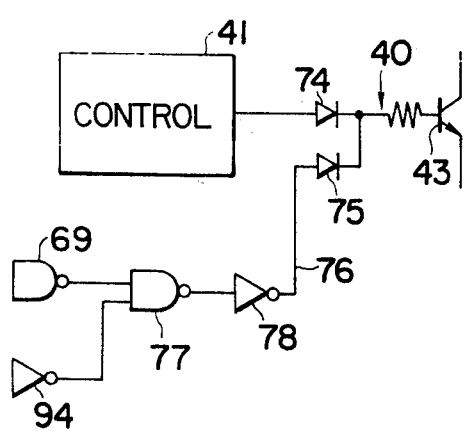
FIG. 5
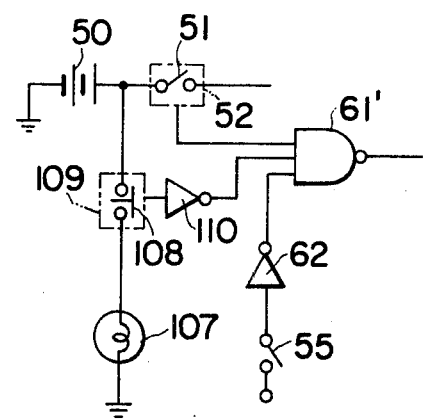

TEST SYSTEM FOR SKID CONTROL APPARATUS

REFERENCE TO CO-PENDING APPLICATIONS

Reference is made herein to the co-pending application of Takashi Ochiai, Ser. No. 270,584, filed July 11, 1972, now U.S. Pat. No. 3,848,933, entitled "Skid Control System for Vehicles" and assigned to the same assignee as the present application. The content of that patent is hereby made a part of this application as if fully recited herein.

The skid control system or systems disclosed in this co-pending application is an example of the type of skid control systems which can be tested according to the present invention.

BACKGROUND OF THE INVENTION

This invention relates generally to skid control systems which prevent wheels in automotive vehicles from locking when the brake is suddenly applied, and more particularly to test systems for automatically testing the operation of such skid control devices.

Such skid control systems are not always actuated whenever the brake is applied. Rather they are actuated only when an excessive retarding force is applied to the wheels and the tires tend to skid because of an insufficient coefficient of friction between the tires and the road surface. This ensures maneuverability and prevents the vehicle from dangerously swinging off the road. Thus skid control systems in vehicles are not operated often. However, reliable operation of skid control systems must always be available when the tires tend to skid, even when the system has not been used for a relatively long time. Skid control systems therefore must be tested from time to time in order to ensure their reliable operation.

An object of the present invention is to provide a system for automatically testing the operation of a skid control apparatus at suitable frequencies without adversely affecting the brake application and without imposing any burden on the driver.

SUMMARY OF THE INVENTION

The various features of novelty which characterize the invention are pointed out in the claims. According to one feature of the invention, a signal which actuates the skid control apparatus is produced in response to the vehicle's engine starting and a detector determines whether the skid control system is operating normally or abnormally and stores this information in a memory which sets off an alarm.

According to an embodiment of the invention suitable means suppress the actuating signal as soon as the memory stores the output signal.

According to another feature of the invention, the actuating signal is inhibited if the brake is being used at the time the engine is started.

These and other features of the invention are pointed out in the claims. Other objects and advantages of the invention will become evident from the following detailed description when read in light of the accompanying drawings.

BRIEF DESCRIPTION OF THE DRAWINGS

FIGS. 3a to 3p' are graphs illustrating the waveforms at various points in the circuit of FIG. 2 so as to explain the operation thereof.

FIGS. 4 and 5 are circuit diagrams of the circuit in FIG. 2, such modifications embodying features of the invention.

DESCRIPTION OF PREFERRED EMBODIMENTS

Figure 1:
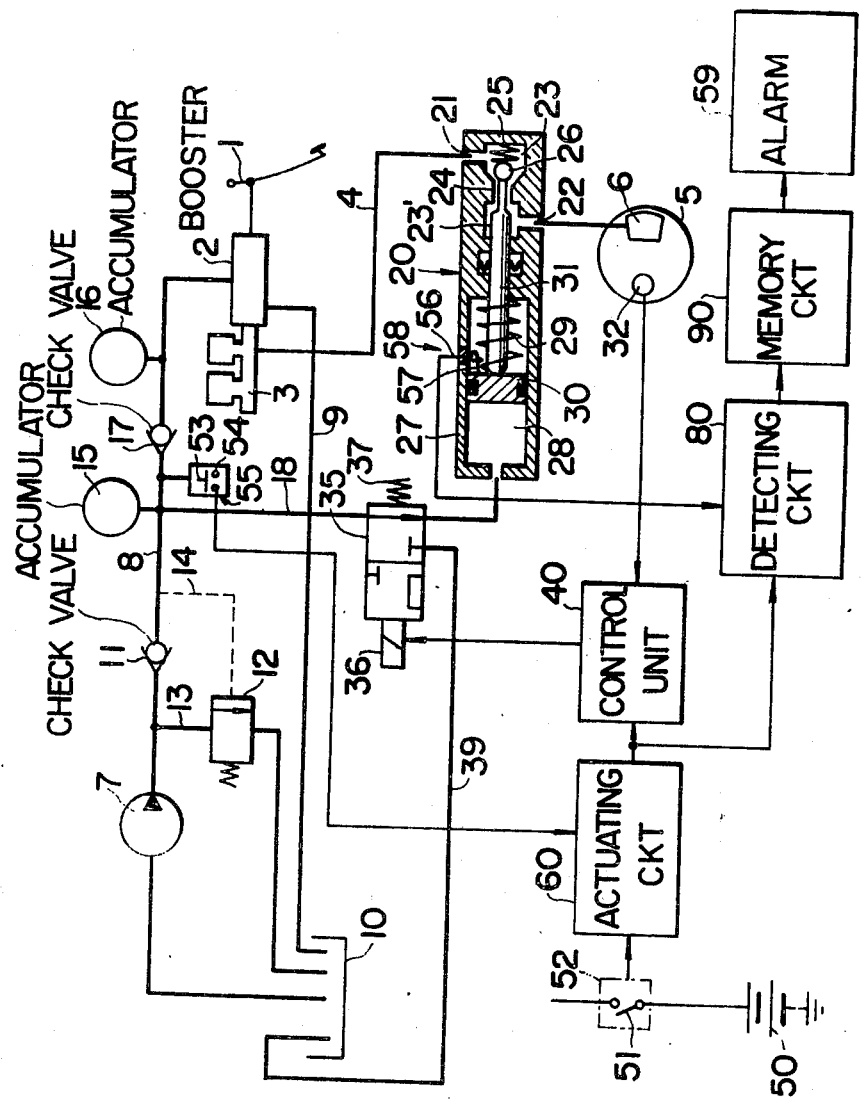
FIG. 1 is a schematic and partially block diagram of a skid control apparatus utilizing an operational test system embodying features of the invention.

In FIG. 1, a brake pedal 1 is operatively coupled through a hydraulic brake booster 2 to a master cylinder 3. A hydraulic line 4 operatively couples the master cylinder 3 to a wheel cylinder 6 of a wheel 5 through an intervening hydraulic modulator 20. A hydraulic pump 7 driven by the engine of an automotive vehicle discharges pressurized liquid which flows through a hydraulic line 8 into the booster 2. A hydraulic line 9 returns the working oil under pressure discharged from the booster 2 to a reservoir 10. Inserted in the hydraulic line are a check valve 11 and an unloader valve 12 as well as a hydraulic line 13 for discharging the excess hydraulic liquid into the reservoir 10. Another hydraulic line 14 branched from the pipeline 8 serves to transmit the pilot pressure. Two accumulators 15 and 16 hydraulically connected to the line 8 straddle a check valve 17 serially connected in the line 8. A hydraulic line 18 which includes a solenoid controlled directional control valve 35 connects the line 8 and the hydraulic modulator 20.

In the hydraulic modulator 20 ports 21 and 22 hydraulically communicate with the master cylinder 3 and the wheel cylinder 6, respectively. Oil chambers 23 and 23' form a communicating passage between the ports 21 and 22. Communication between the ports 21 and 22 is interrupted when a spring 25 presses a valve 26 against a receiving valve seat 24 suitably formed within the oil chamber 23.

A cylinder 27 defines an oil chamber 28 within the modulator 20. The force of a return spring 29 moves a piston 30 slidably fitted into the cylinder 27 against the hydraulic pressure in the oil chamber 28. A plunger 31 extends through the oil chamber 23' which communicates with the port 22 and the wheel cylinder 6. The ends of the plunger 31 are securely fixed to the piston 30 and the ball 26. As the plunger 31 is moved to the right the ball 26 moves away from the valve seat 24 so that the oil chamber 23' communicates with the oil chamber 23. When the plunger 31 moves to the left, the ball 26 is pressed against the valve seat 24 thereby interrupting communication between the oil chambers 23 and 23'. Because of the plunger's (31) axial diameter, the volume of the oil chamber 23' decreases as the plunger moves to the left as shown in FIG. 1.

The direction control valve 35 is of the three-port two-position type and includes a solenoid 36 and a spring 37. In its unenergized condition, the directional control valve 35 opens the hydraulic line 18 to fluid flow and causes communication between the hydraulic line 8 and the hydraulic modulator 20 through the line 18. However, when the solenoid 36 is energized, the directional valve assumes its energized condition in which the hydraulic modulator 20 communicates with the reservoir 10 through a return line 39.

A conventional tachometer 32 or other device adapted to detect electrically the speed of a wheel is attached to the wheel 5. A control unit 40 electrically connects the tachometer 32 to the solenoid 36. The control unit 40 energizes the solenoid 36 in dependence upon the speed of the wheel 5 as detected by the tachometer 32.

In overall operation, when the engine is started, the hydraulic pump 7 drives hydraulic liquid under pressure through the underloader valve 12 and the line 8 into the accumulators 15 and 16 and into the booster 2. In its quiescent state when the directional control valve 35 is not energized, the hydraulic liquid under pressure also flows through the line 18 into the chamber 28 of the hydraulic modulator 20. This shifts the piston 30 and the plunger 31 to the right against the force of the spring 29. The resulting movement unseats the ball 26 from the valve seat 24 against the force of the spring 25. This allows the master cylinder 3 to transmit hydraulic fluid through the line 4 and to the wheel cylinder 6.

Even when the engine is stopped and the hydraulic pump does not supply fluid under pressure, the check valve 11 and 17 cause the accumulators 15 and 16 to supply hydraulic pressure to the hydraulic modulator 20 and the booster 2 respectively. Brake pressure may therefore be applied in the normal manner.

When the brake pedal 1 is applied by depressing it, the hydraulic pressure in the master cylinder 3 builds up through the booster 2 in proportion to the stroke of the brake pedal. It is then supplied to the wheel cylinder 6 so that a brake force is applied to the wheel 5. The tachometer 32 detects the rotational speed of the wheel 5 and applies this value to the control unit 40. The latter computes the slip ratio or deceleration from the speed of the wheel 5. The control unit 40 compares the slip ratio or deceleration with a predetermined value which corresponds to the maximum coefficient of brake friction thereby to detect whether or not the wheel 5 is locked or may lock. At a low slip ratio when no fear of wheel lock exists the control unit 40 produces no output signals so that the directional control valve remains unenergized. Therefore, both the directional control valve and the hydraulic modulator remain in their normal positions so that the brake pedal produces a braking force in proportion to the stroke of the brake pedal.

When the detected slip ratio exceeds a predetermined magnitude indicating that the wheel 6 is locking or likely to lock, the unit 40 energizes the solenoid 36 of the directional control valve 35. The latter then shifts to the position allowing the hydraulic fluid in the oil chamber 28 of the hydraulic modulator 20 to discharge into the reservoir 10. As a result, the force of the spring 29 and the hydraulic pressure acting upon the plunger 31 in the oil chamber 23 shifts the piston 30 to the left. This allows the force of the spring 25 to press the ball 26 against the valve seat 24. The resulting action interrupts the supply of hydraulic liquid under pressure from the master cylinder 3 to the wheel cylinder 6 through the line 4.

As the plunger 31 shifts to the left, the volume of the oil in the chamber 23' increases. The increased volume causes the hydraulic pressure in the wheel cylinder 6 to drop. The drop reduces the braking force of the wheel cylinder 6 and prevents the wheel 5 from locking.

When the effect of the decreased braking force restores the slip ratio to less than a predetermined value, the control unit 40 de-energizes the solenoid 6 of the directional control valve 35. The latter and the hydraulic modulator 20 then return to their normal positions. The modulator 20 then again allows the master cylinder to apply hydraulic liquid under pressure to the wheel cylinder 6 so as to increase the braking force. These increases and decreases in the hydraulic pressure in the wheel cylinder 6 are automatically repeated. Thus, no matter how hard an operator depresses the brake pedal, the hydraulic pressure in the brake system remains below a pressure sufficient to cause a skid. Therefore, the retarding force is applied so that the coefficient of friction is always kept at the maximum.

Test equipment for testing the operation of the aforementioned skid control system is shown by a block diagram in FIG. 1. Here, a battery 50 energizes the electrical system of a vehicle through an ignition switch 51 which includes a switch for detecting whether the engine is started or not. A movable contact or armature 53 responds to the hydraulic pressure in the line 8 downstream of the check valve 11 by contacting a fixed contact 54 within a hydraulic pressure detecting switch 55. In response to output signals indicating the positions of the detecting switches 52 and 55, an actuating circuit 60 is energized to cause hydraulic pressure modulation. A fixed contact 56 attached to the main body 20' of the hydraulic modulator 20 and a movable contact or armature 57 fixed to the piston 30 form a detecting switch for detecting the shift or displacement of the piston 30. A comparator or detecting circuit 80 compares the output signal from the actuating circuit 60 with the output signal of the detecting switch 58 in order to indicate failure of the skid control system. A memory 90 stores the output of the comparator or detecting circuit 80. An alarm device 59 such as a lamp or buzzer warns the driver of failure of the skid control system.

Figure 2:
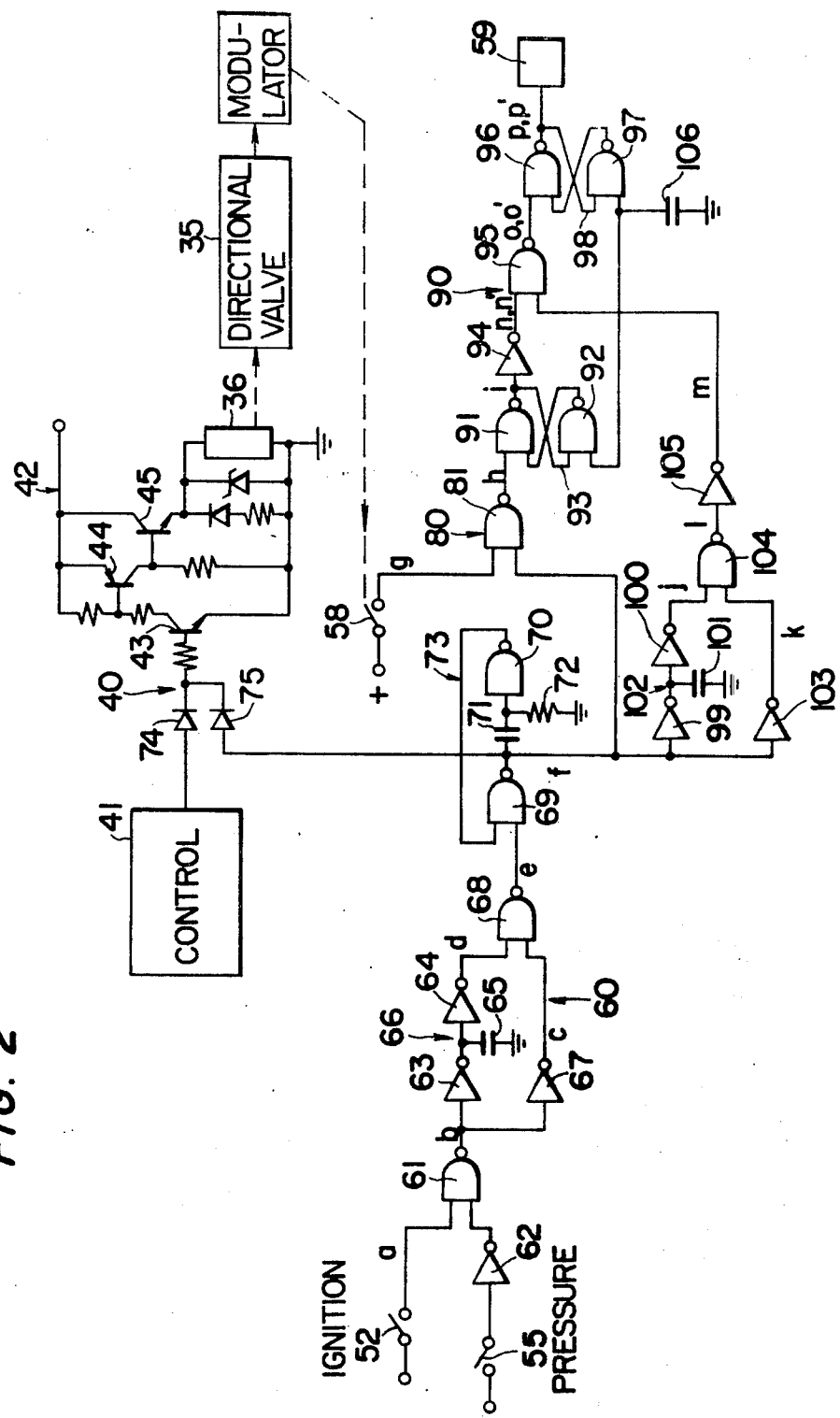
FIG. 2 is a partly schematic and partly logic diagram showing details of the test system in FIG. 1.

In FIG. 2, the engine-start detecting switch 52 produces an output signal only when the driver turns the ignition and start switch. The hydraulic pressure detecting switch 55 produces an output signal which is interrupted when the hydraulic pressure reaches a predetermined normal pressure.

In the actuating circuit 60, a NAND gate 61 receives the output terminal of the detecting switch 52 at one input terminal, and the output of the switch 55 at the other input terminal through a NOT gate or inverter 62. The output terminal of the NAND gate 61 is connected to one input terminal of the NAND gate 68 through a delay circuit 66 composed of NOT gates 63 and 64 with a capacitor 65 between them. The output terminal of the NAND gate 61 is connected to the other input terminal of the NAND gate 68 through a NOT gate 67. The interconnections between the NAND gate 61 and 68 allow the start of the operating test to be established.

The output of the NAND gate 68 controls a monostable multivibrator 73 composed of two NAND gates 69 and 70, a capacitor 71, and a resistor 72. A pulse signal may be derived from the output terminal of the NAND gate 69 when the operating test is to be started. For controlling the hydraulic pressure modulation a diode 75 connects the output of the NAND gate 69 to the control unit 40.

A control 41 which responds to the output signals from the tachometer 32 applies its output to the base of a switching transistor 43 through a diode 74. The transistor 43 forms part of a driver 42 and conducts in response to the output of the signal from the control 41, when wheel lock occurs or is imminent. Another switching transistor 44 and a current amplifying transistor 45 then also conduct. A positive going output from the NAND gate 69 also causes transistors 43, 44, and 45 to conduct. Conduction of these transistors causes energization of the solenoid 36. The diodes 74 and 75 form an OR gate between the two inputs composed of NAND gate 69 and computer 41 and the output at transistor 43.

When the hydraulic pressure modulator is not activated, the contacts 56 and 57 of the detecting switch 58 are closed so that no output signal is derived. However, when the hydraulic pressure modulator 20 is actuated, the piston 30 carrying the contact 57 is shifted away from the contact 56 so as to open the switch 58 and produce an output signal.

In the detecting circuit 80, the output terminals of the NAND gate 69 and the detecting switch are connected to the input terminals of a NAND gate 81. This allows an indication, of whether failure of the system has occurred, to be detected in response to the outputs of the NAND gate 69 and the switch 58.

In the memory circuit 90, a first flip-flop 93 is composed of two NAND gates 91 and 92 and has its set input terminal connected to the output terminal of the NAND gate 81. In the memory 90, a NOT gate 94 reverses the signal at the set output terminal of the flip-flop 93 and applies it to one input terminal of a NAND gate 95 whose output terminal is connected to the set input terminal of a second flip-flop 98 composed of two NAND gates 96 and 97. The signals may thus be stored in two steps by the two flip-flops 93 and 98.

In the detecting circuit 80, two NOT gates 99 and 100 and a capacitor 101 form a delay circuit 102 which receives its input from the NAND gate 69. The delay circuit 102, together with a NOT gate 103, a NAND gate 104 and a NOT gate 105 control the memory circuit 90. The NOT gate 103 also receives its input from the NAND gate 69, and its output as well as that of the delay circuit 102 is applied to the input of the NAND gate 104 whose output is applied to the other input terminal of the NAND gate 95 in the memory circuit 90. This permits the state of flip-flop 93 to be checked immediately after the operation test is started. The reset input terminals of the two flip-flops 93 and 98 are interconnected and grounded through a capacitor 106 so that no input signal can be derived from the set output terminals of the flip-flops 93 and 98 when the power switch is closed. The set output terminal of the flip-flop 98 actuates the alarm device 59.

FIGS. 3a to 3p' illustrate the waveforms at various points in the system operation test equipment of FIGS. 1 and 2.

In operation the driver turns on the ignition with the starter switch 52. This starts the engine so that hydraulic pressure in the brake system rises to a normal level. As a result, the input signals at the time $t_1$ shown in FIG. 3a are applied to the NAND gate 61 to produce the output signal shown in FIG. 3b. Letters corresponding the suffix letters of FIGS. 3a to 3p' designate the locations of the signals of FIGS. 3a to 3p' in the remaining figures. Thus the signals in FIGS. 3a and 3b appear at a and b in FIG. 2.

As shown in FIG. 3b, the output of NAND gate 61 falls to a low level in response to the input signal at a. If either of the input signals is at a low level, the output of NAND gate 61 is high.

The NOT gate 67 inverts the input to the NAND gate 68 as shown in FIG. 3c while the delay circuit 66 delays the signal at d by a time $t_d$ depending upon the time required to charge the capacitor 65 as shown in FIG. 3d. As a result the NAND gate 68 produces a trigger pulse with a very short pulse duration $t_d$ as shown in FIG. 3e. This determines the time for starting the operation test.

In response to the trigger pulse at e, the monostable multivibrator 73 produces a high signal at the output of NAND gate 69 as illustrated in FIG. 3f. The pulse at f lasts until the time $t_2$, namely it has its duration of about one second which is the minimum time required for the system operation test. The time of the pulse at f depends upon a time constant established by the capacitance of the capacitor 72 and the resistance of the resistor 72.

The driver 42 in the control unit 40 receives the output at f to energize the solenoid 36. This shifts the directional control valve in the manner described so as to discharge the hydraulic liquid. This allows the spring 29 to shift the piston 30 in the hydraulic modulator 20 to the left. As a result the switch 58 produces the output signal shown at g. However, when the directional control valve 35 does not shift or when the piston 30 in the hydraulic modulator 20 sticks so that it does not move even when the directional control valve is energized, the output of the detecting switch 58 remains at a low level. Therefore, when the skid control system is normal, the output signal of the NAND gate 81 in the detecting circuit 80 remains low for a predetermined time as shown in FIG. 3h, but rises to a high level in response to failure or malfunction.

The output of the flip-flop 93 in the memory circuit 90 changes from low to high when the power switch is turned on and the operation of the skid control system is normal as indicated in FIG. 3i. The output signals remains low during malfunction or failure.

The delay circuit 102 responds to the output of the monostable multivibrator 73 by producing the signal shown in FIG. 3j. At the same time the output of the multivibrator 73 produces the signal shown in FIG. 3k at the output of NOT gate 103. The NAND gate 104 responds to its two inputs with a negative going short time trigger illustrated in FIG. 3-1. The NOT gate 105 inverts the trigger as shown in FIG. 3m and applies it to one input of the AND gate 95. A NOT gate 94 applies the inverse of the output of the flip-flop 93 to the other input of the NAND gate 95. If the output of the flip-flop 93 is that shown in FIG. 3i, then the upper input to the NAND gate 95 appears as shown in FIG. 3n. If, for example, there has been no signal from the switch 58 and the output of the flip-flop 93 is simply a continuous low level, then the output of the NOT gate 94 follows the path indicated in FIG. 3n'.

Therefore when the system operation is normal, the output signal of AND gate 95 remains at a high level as shown in FIG. 3o. During malfunction, the signal falls to and remains at a low level for a predetermined short time as shown at FIG. 3o'. Thus, during normal operation, the flip-flop 98 produces a low level output as indicated in FIG. 3b. During a malfunction it switches to a high level output as indicated in FIG. p'. The high level output actuates an alarm device 59.

According to an aspect of the invention, the solenoid controlled directional control valve 35 and the hydraulic modulator 20 are switched into their active state for a short time, as for wheel lock, immediately after the engine is started so that the operation of the skid control system can be tested automatically. However, during the system operation test, the hydraulic modulator 20 interrupts the supply of pressurized hydraulic liquid to the wheel cylinder 6 for a short time. This is undesirable because it prevents the brake from being applied. According to an embodiment of the invention, this defect is overcome by the arrangement of FIG. 4. Here an auxiliary circuit 76 connects the NAND gate 69 and the NOT gate 94 to the diode 75. In the circuit 76 a NAND gate 77 produces a low output in response to high inputs from the gates 69 and 94. A NOT gate 78 then reverses the output of gate 77.

When the normal operation of the system is confirmed by the detecting circuit 80 and stored in the flip-flop 93 of the memory circuit 90 so that the NOT gate 94 produces the output signal indicated in FIG. 3n, the output signal from the NAND gate 69 is cancelled by the NAND gate 77. The NOT gate 78 then inverts the output of NAND gate 77. Thus the switching transistors 43 and 44 and amplifying transistors 45 are cut off so that solenoid 36 is de-energized. This returns the directional control valve 35 and the hydraulic modulator to their normal positions. This way the brake may be applied during the operation test.

From the standpoint of safety, it is desirable to interrupt the system operation test when a vehicle is on a grade because the brake must be applied in order not to be moved of itself. The arrangement of FIG. 5 modifies the system of FIG. 2 to furnish this possibility. Here a 3-input NAND gate 61' is used in place of the 2-input NAND gate 61 in the actuating circuit 60. A brake application detecting switch 109 which is incorporated into the brake or stop light switch 108 to turn the stop lights on and off produces an output signal only when the brake pedal is depressed. A NOT gate 110 applies the output signal to the third input terminal of the NAND gate 61'. Thus when the brake is applied while the engine is started, the output signal of NOT gate 110 is at a low level. This causes the output of NAND gate 61 to remain at a high level. As a result, the signal for actuating the test equipment is not produced.

As described, the skid control system is automatically tested when the engine is started. This helps assure reliable operation thereof. It relieves the driver from a complicated and time-consuming manual test and avoids omission of the test. Moreover, because the system operation test occurs only when the brake is not applied as the engine is started the test will not adversely affect the vehicle's operation. Furthermore, the frequency of the operation test is adequate and satisfactory. The disadvantages of the first embodiment are satisfactorily overcome by the second and third embodiments described with reference to FIGS. 4 and 5 respectively.

As hereinbefore described, a driver may automatically carry out the system operation test with the control unit 40. Inspection of the control 41 may be effected by utilizing the output signal of the NAND gate 69 or 75 as described in U.S. Pat. No. 3,745,522. In the instant embodiments, the hydraulic pressure intensified by the booster 2 is used to actuate the hydraulic modulator 20. However, it will be understood that the negative pressure available from the engine may be used in a manner substantially similar to that described above. In that case, instead of the hydraulic pressure detecting switch, a pressure sensitive switch for detecting negative pressure may be used.

According to another embodiment of the invention, the engine start signal or the rotational speed of the engine is used to determine the time for starting the system operation test instead of the power hydraulic pressure. Alternately, the system operation equipment is actuated at a predetermined frequency in response to pulses generated at a predetermined time interval or whenever the automotive vehicle travels over a predetermined distance even while the vehicle is running.

In such embodiments the switch 55 represents a switch indicating the rotational speed of the engine, the output of a pulse generator which generates pulses at a predetermined time interval or whenever the vehicle travels over a predetermined distance while the vehicle is running.

The type of skid control apparatus which the system according to the present invention can test is disclosed in the aforementioned co-pending application, Ser. No. 270,584, now U.S. Pat. No. 3,848,933, and would include a control such as the control 41.

While embodiments of the invention have been described in detail, it will be obvious to those skilled in the art that the invention may be embodied otherwise without departing from its spirit and scope.

What is claimed is:

1. For a skid-control system having a hydraulic modulator adapted to modulate the hydraulic brake pressure from a master cylinder to a wheel cylinder in a vehicle having an engine, and means for actuating said hydraulic modulator when wheels start to lock, an operational test system, comprising:
   A. first detecting means for detecting whether the engine is started or not and producing an output signal in response to the engine being started so as to establish a starting time for the test;
   B. an actuating circuit coupled to said first detecting means to cause the hydraulic modulator actuating means to actuate the hydraulic modulator in response to the output signal from said first detecting means;
   C. second detecting means coupled to said modulator for detecting the operation of said modulator and producing output signals indicative of the operation of the hydraulic modulator;
   D. a detecting circuit coupled to said second detecting means and said actuating circuit for detecting whether the operation of said skid control system is normal or abnormal in response to the output signals from said second detecting means and said actuating circuit and producing signals indicative of normal or abnormal operation of said skid control system;
   E. a memory circuit coupled to said detecting circuit to store therein the output signal from said detecting circuit and to generate an output signal when the operation of said skid control system is abnormal, and
   F. an alarm device coupled to said memory circuit to generate an alarm signal in response to the output signal from said memory circuit.

2. A system as in claim 1, wherein said actuating circuit includes means responsive to said detecting circuit for suppressing the signal which actuates said hydraulic modulator actuating means when the output signal from said detecting circuit has been stored in said memory circuit.

3. A system as in claim 1, wherein said first detecting means includes means for detecting whether the brake is applied and for suppressing the output signal from said first detecting means when the brake is applied.

4. A system as in claim 3, wherein said actuating circuit includes means responsive to said detecting circuit for suppressing the signal which actuates said hydraulic modulator actuating means when the output signal from said detecting circuit has been stored in said memory circuit.

5. A system as in claim 1, wherein the vehicle furnishes pressurized oil to the master cylinder, and wherein said first detecting means includes an ignition switch responsive to operation by a driver and a pressure switch responsive to the pressurized liquid not reaching a normal pressure, a coincidence gate in said first detecting means coupled to said switches for producing the output signal of said first detecting means in response to operation of said switches.

6. A system as in claim 1, wherein said actuating means includes pulse forming means responsive to said first detecting means for producing a pulse having a predetermined width in response to the output signal from said first detecting means.

7. A system as in claim 6, wherein the output signal from said first detecting means is in the form of a step, said actuating means including delay means to delay the step and a coincidence gate responsive to the delay means and the step so as to produce a trigger, said pulse forming means including a monostable multi-vibrator for producing the pulse.

8. A system as in claim 1, wherein said memory circuit includes a flip-flop to store changes in the output of said second detecting means.

9. A system as in claim 8, wherein said memory circuit includes a delay trigger circuit coupled to said actuating circuit for producing a trigger offset from the change in output of said second detecting means and coincidence gate means for producing the output of said memory circuit during coincidence of the trigger from said delay trigger circuit and the output of the flip flop to indicate in the form of an output signal whether there has been a change in the output of said second detecting means.

10. A system as in claim 9, wherein said memory circuit includes a second flip-flop to store the output of the coincidence gate means to maintain the alarm device in its operative or inoperative condition.

11. A system as in claim 2, wherein the vehicle furnishes pressurized oil to the master cylinder, and wherein said first detecting means includes an ignition switch responsive to operation by a driver and a pressure switch responsive to the pressurized liquid not reaching a normal pressure, a coincidence gate in said first detecting means coupled to said switches for producing the output signal of said first detecting means in response to operation of said switches.

12. A system as in claim 2, wherein said actuating means includes pulse forming means responsive to said first detecting means for producing a pulse having a predetermined width in response to the output signal from said first detecting means.

13. A system as in claim 12, wherein the output signal from said first detecting means is in the form of a step, said actuating means including delay means to delay the step and a coincidence gate responsive to the delay means and the step so as to produce a trigger, said pulse forming means including a monostable multi-vibrator for producing the pulse.

14. A system as in claim 2, wherein said memory circuit includes a flip-flop to store changes in the output of said second detecting means.

15. A system as in claim 14, wherein said memory circuit includes a delay trigger circuit coupled to said actuating circuit for producing a trigger offset from the change in output of said second detecting means and coincidence gate means for producing the output of said memory circuit during coincidence of the trigger from said delay trigger circuit and the output of the flip-flop to indicate the form of an output signal whether there has been a change in the output of said second detecting means.

16. A system as in claim 15, wherein said memory circuit includes a second flip-flop to store the output of the coincidence gate means to maintain the alarm device in its operative or inoperative condition.

17. A system as in claim 3, wherein the vehicle furnishes pressurized oil to the master cylinder, and wherein said first detecting means includes an ignition switch responsive to operation by a driver and a pressure switch responsive to the pressurized liquid not reaching a normal pressure, a coincidence gate in said first detecting means coupled to said switches for producing the output signal of said first detecting means in response to operation of said switches.

18. A system as in claim 3, wherein said actuating means includes pulse forming means responsive to said first detecting means for producing a pulse having a predetermined width in response to the output signal from said first detecting means.

19. A system as in claim 18, wherein the output signal from said first detecting means is in the form of a step, said actuating means including delay means to delay the step and a coincidence gate responsive to the delay means and the step so as to produce a trigger, said pulse forming means including a monostable multi-vibrator for producing the pulse 20. A system as in claim 3, wherein said memory circuit includes a flip-flop to store changes in the output of said second detecting means.

21. A system as in claim 20, wherein said memory circuit includes a delay trigger circuit coupled to said actuating circuit for producing a trigger offset from the change in output of said second detecting means and coincidence gate means for producing the output of said memory circuit during coincidence of the trigger from said delay trigger circuit and the output of the flip-flop to indicate in the form of an output signal whether there has been a change in the output of said second detecting means.

22. A system as in claim 21, wherein said memory circuit includes a second flip-flop to store the output of the coincidence gate means to maintain the alarm device in its operative or inoperative condition.

23. A system as in claim 4, wherein the vehicle furnishes pressurized oil to the master cylinder, and wherein said first detecting means includes an ignition switch responsive to operation by a driver and a pressure switch responsive to the pressurized liquid not reaching a normal pressure, a coincidence gate in said first detecting means coupled to said switches for producing the output signal of said first detecting means in response to operation of said switches.

24. A system as in claim 5, wherein said actuating means includes pulse forming means responsive to said first detecting means for producing a pulse having a predetermined width in response to the output signal from said first detecting means.

25. A system as in claim 24, wherein the output signal from said first detecting means is in the form of a step, said actuating means including delay means to delay the step and a coincidence gate responsive to the delay means and the step so as to produce a trigger, said pulse forming means including a monostable multi-vibrator for producing the pulse.

26. A system as in claim 5, wherein said memory circuit includes a flip-flop to store changes in the output of said second detecting means.

27. A system as in claim 26, wherein said memory circuit includes a delay trigger circuit coupled to said actuating circuit for producing a trigger offset from the change in output of said second detecting means and coincidence gate means for producing the output of said memory circuit during coincidence of the trigger from said delay trigger circuit, and the output of the flip-flop to indicate in the form of an output signal whether there has been a change in the output of said second detecting means.

28. A system as in claim 17, wherein said memory circuit includes a second flip-flop to store the output of the coincidence gate means to maintain the alarm device in its operative or inoperative condition.

29. A system as in claim 28, wherein said actuating means includes pulse forming means responsive to said first detecting means for producing a pulse having a predetermined width in response to the output signal from said first detecting means.

30. A system as in claim 29, wherein the output signal from said first detecting means is in the form of a step, said actuating means including delay means to delay the step and a coincidence gate responsive to the delay means and the step so as to produce a trigger, said pulse forming means including a monostable multi-vibrator for producing the pulse.

31. A system as in claim 6, wherein said memory circuit includes a flip-flop to store changes in the output of said second detecting means.

32. A system as in claim 31, wherein said memory circuit includes a delay trigger circuit coupled to said actuating circuit for producing a trigger offset from the change in output of said second detecting means and coincidence gate means for producing the output of said memory circuit during coincidence of the trigger from said delay trigger circuit and the output of the flip-flop to indicate in the form of an output signal whether there has been a change in the output of said second detecting means.

33. A system as in claim 32, wherein said memory circuit includes a second flip-flop to store the output of the coincidence gate means to maintain the alarm device in its operative or inoperative condition.

34. A system as in claim 33, wherein said actuating circuit includes means responsive to said detecting circuit for suppressing the signal which actuates said hydraulic modulator actuating means when the output signal from said detecting circuit has been stored in said memory circuit, wherein the output signal from said first detecting means is in the form of a step, said actuating means including delay means to delay the step and a coincidence gate responsive to the delay means and the step so as to produce a trigger, said pulse forming means including a monostable multi-vibrator for producing the pulse.

35. A vehicle, comprising
A. an engine;
B. a plurality of wheels;
C. a wheel cylinder on at least one of the wheels;
D. a master cylinder for providing hydraulic brake pressure to the wheel cylinder;
E. a skid-control system having a hydraulic modulator for modulating the hydraulic brake pressure between the master cylinder and the wheel cylinder;
F. first detecting means for detecting whether the engine is started or not and producing an output signal in response to the engine being started so as to establish a starting time for the test;
G. an actuating circuit coupled to said first detecting means to cause the hydraulic modulator actuating means to actuate the hydraulic modulator in response to the output signal from said first detecting means;
H. second detecting means coupled to said modulator for detecting the operation of said modulator and producing output signals indicative of the operation of the hydraulic modulator;
I. a detecting circuit coupled to said second detecting means and said actuating circuit for detecting whether the operation of said skid control system is normal or abnormal in response to the output signals from said second detecting means and said actuating circuit and producing signals indicative of normal or abnormal operation of said skid control system;
J. a memory circuit coupled to said detecting circuit to store therein the output signal from said detecting circuit and to generate an output signal when the operation of said skid control system is abnormal, and
K. an alarm device coupled to said memory circuit to generate an alarm signal in response to the output signal from said memory circuit.

36. A vehicle as in claim 35, wherein said actuating circuit includes means responsive to said detecting circuit for suppressing the signal which actuates said hydraulic modulator actuating means when the output signal from said detecting circuit has been stored in said memory circuit, said actuating means including pulse forming means responsive to said first detecting means for producing a pulse having a predetermined width in response to the output signal from said first detecting means, the output signal from said first detecting means being in the form of a step, said actuating means including delay means to delay the step and a coincidence gate responsive to the delay means and the step so as to produce a trigger, said pulse forming means including a monostable multivibrator for producing the pulse, said memory circuit including a flip-flop to store changes in the output of said second detecting means, said memory circuit including a delay trigger circuit coupled to said actuating circuit for producing a trigger offset from the change in output of said second detecting means and coincidence gate means for producing the output of said memory circuit during coincidence of the trigger from said delay trigger circuit and the output of the flip-flop to indicate in the form of an output signal whether there has been a change in the output of said second detecting means, said memory circuit including a second flip-flop to store the output of the coincidence gate means to maintain the alarm device in its operative or inoperative condition.

* * * * *